United States Patent
Ross et al.

(10) Patent No.: US 8,125,862 B2
(45) Date of Patent: Feb. 28, 2012

(54) SYSTEM AND METHOD FOR CONTROLLING TRACKING IN AN OPTICAL DRIVE

(75) Inventors: John Anderson Fergus Ross, Niskayuna, NY (US); Kenneth Brakeley Welles, Scotia, NY (US); John Erik Hershey, Ballston Lake, NY (US); Xiaolei Shi, Niskayuna, NY (US); Victor Petrovich Ostroverkhov, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/338,841

(22) Filed: Dec. 18, 2008

(65) Prior Publication Data
US 2011/0170391 A1 Jul. 14, 2011

(51) Int. Cl.
*G11B 7/00* (2006.01)
(52) U.S. Cl. ............ 369/44.41; 369/124.04; 369/44.25; 369/44.34
(58) Field of Classification Search .................. 369/103, 369/44.41, 44.26, 44.11, 44.25, 124.04, 124.02, 369/124.03, 53.23, 53.19, 44.34, 59.17, 59.23; 359/3, 31, 32
See application file for complete search history.

(56) References Cited

U.S. PATENT DOCUMENTS

| 5,450,218 A | 9/1995 | Heanue et al. |
| 5,510,912 A | 4/1996 | Blaum et al. |
| 5,526,330 A * | 6/1996 | Ogata et al. ............... 369/44.14 |
| 5,727,226 A | 3/1998 | Blaum et al. |
| 5,808,998 A | 9/1998 | Curtis et al. |
| 6,175,317 B1 | 1/2001 | Ordentlich et al. |
| 6,549,664 B1 | 4/2003 | Daiber et al. |
| 6,563,779 B1 | 5/2003 | McDonald et al. |
| 6,711,711 B2 | 3/2004 | Hwang |
| 6,738,322 B2 | 5/2004 | Amble et al. |
| 6,889,907 B2 | 5/2005 | Roh |
| 7,020,054 B2 | 3/2006 | Kadlec et al. |
| 7,388,695 B2 | 6/2008 | Lawrence et al. |
| 7,411,872 B1 * | 8/2008 | Xavier da Silveira ........ 369/103 |
| 2003/0031112 A1 * | 2/2003 | Horimai ........................ 369/103 |
| 2004/0004914 A1 * | 1/2004 | Ceshkovsky .................. 369/103 |
| 2005/0136333 A1 | 6/2005 | Lawrence et al. |
| 2006/0073392 A1 | 4/2006 | Erben et al. |

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Thang Tran
(74) *Attorney, Agent, or Firm* — Fletcher Yoder

(57) ABSTRACT

The present techniques provide methods and systems for alignment of a read head with data tracks on an optical data disk. In embodiments, a multi-pixel detector that is segmented into multiple areas, or detector segments, may be used to detect a pattern in the light reflected from an optical data disk. The detector system may then combine the quantized values from each of the detector segments mathematically to determine the alignment of the read head with a target data track. If the read head drifts to one side or the other, detectors to the side of a center detector may start to pick up energy from the adjacent tracks. If this energy is continuously summed for the detectors on each side, the read head may be centered by balancing the sums from the detectors on each side.

19 Claims, 5 Drawing Sheets

U.S. PATENT DOCUMENTS

| | | | |
|---|---|---|---|
| 2006/0078802 | A1 | 4/2006 | Chan et al. |
| 2006/0215529 | A1* | 9/2006 | Uno et al. ............... 369/103 |
| 2006/0227398 | A1* | 10/2006 | Lawrence et al. ........... 359/15 |
| 2007/0097469 | A1 | 5/2007 | Erben et al. |
| 2007/0146835 | A1 | 6/2007 | Erben et al. |
| 2007/0147200 | A1* | 6/2007 | Ogawa ............... 369/44.37 |
| 2007/0237042 | A1* | 10/2007 | Kim et al. ............. 369/44.37 |
| 2008/0055686 | A1 | 3/2008 | Erben et al. |
| 2008/0144145 | A1 | 6/2008 | Boden et al. |
| 2008/0144146 | A1 | 6/2008 | Boden et al. |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/338,828, filed Dec. 18, 2008, John Anderson Fergus Ross et al.
U.S. Appl. No. 12/342,794, filed Dec. 23, 2008, John Anderson Fergus Ross et al.
U.S. Appl. No. 12/343,204, filed Dec. 23, 2008, Ruediger Kusch.
U.S. Appl. No. 12/346,279, filed Dec. 30, 2008, Victor Ostroverkhov et al.
U.S. Appl. No. 12/346,378, filed Dec. 30, 2008, Xiaolei Shi et al.
U.S. Appl. No. 12/347,178, filed Dec. 31, 2008, Victor Ostroverkhov et al.
U.S. Appl. No. 12/347,211, filed Dec. 31, 2008, Xiaolei Shi et al.
U.S. Appl. No. 12/336,399, filed Dec. 16, 2008, John Erik Hershey et al.
U.S. Appl. No. 12/336,414, filed Dec. 16, 2008, John Anderson Fergus Ross et al.
U.S. Appl. No. 12/336,457, filed Dec. 17, 2008, John Anderson Fergus Ross et al.

* cited by examiner

SYSTEM AND METHOD FOR CONTROLLING TRACKING IN AN OPTICAL DRIVE

BACKGROUND

The present techniques relate generally to bit-wise holographic data storage techniques. More specifically, the techniques relate to methods and systems for reading closely spaced bits on optical disks.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080 p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data, typically a plurality of bits, is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, as is the case for all optical storage media, they may be vulnerable to interferences between the closely spaced bits in adjacent tracks and layers. More specifically, the close spacing of adjacent bits makes schemes that allow more accurate reading of these closely spaced bits advantageous.

BRIEF DESCRIPTION

An embodiment of the present techniques provides a method of reading data in an optical disk drive. The method includes emitting a read beam toward an optical data disk, detecting light reflected from the micro-reflectors by a multi-pixel detector, and analyzing a pattern detected by the multi-pixel detector to adjust a tracking of the multi-pixel detector.

Another embodiment provides a detector for reading optical disks, which includes an emitter configured to emit a collimated beam; optical elements configured to focus the collimated beam onto an area of a data disk and collect light reflected from the area of the data disk. The detector also includes a multi-pixel detector configured to detect a pattern from the light reflected from the data disk, and a comparator configured to analyze the pattern and adjust a tracking of the multi-pixel detector.

Another embodiment provides a system for reading a data disk. The system includes a multi-pixel detector configured to read a sequence of patterns from an optical disk, and a bit predictor configured to analyze each of the patterns in the sequence and predict a value for a bit from the pattern to form a sequence of bits. A comparator is configured to analyze each of the patterns in the sequence and adjust a tracking of the multi-pixel detector, and a processor is configured to analyze the sequence of bits and generate a digital data signal.

A further embodiment provides an optical storage disk that includes a recording surface, wherein the recording surface comprises a photosensitive media containing a plurality of micro-holograms. The micro-holograms are configured to be read by a multi-pixel detector that incorporates a tracking mechanism.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
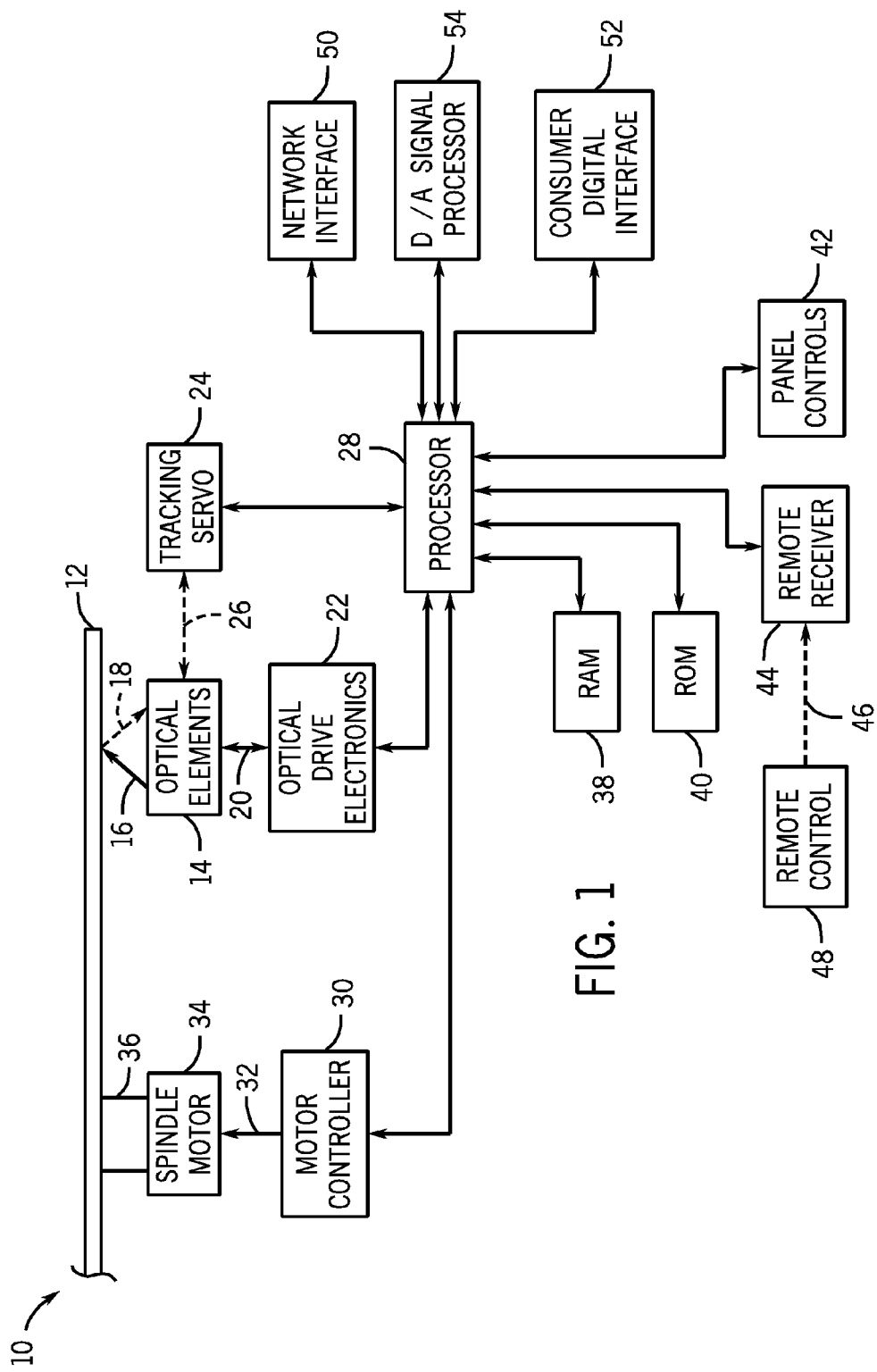
FIG. 1 is a block diagram of an optical disk reader, in accordance with an embodiment of the present techniques.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Bit-wise holographic data storage systems typically use a focused laser as a read beam to read data bits, represented by the presence or absence of micro-holograms on a data disk. Each of the micro-holograms act as a Bragg reflector, which uses an interference pattern to reflect a narrow frequency band of light by constructive and destructive interference. The Bragg reflector may also carry phase information in the interference pattern. The read beam will not generally be focused on a point on the disk, but will cover a finite area, generally in the shape of an hourglass. The finite focal area may limit the minimum separation between adjacent micro-holograms, such as in adjacent tracks, which may be used while still maintaining adequate read accuracy of the individual bits. For example, in accordance with conventional systems, the finite focal area of the beam may limit a separation between adjacent tracks to about 1.5 times the width of the focused beam. The same considerations, e.g., the focal area of the read beam, may impose similar limitations on optical disks that use pits and lands for data storage, including DVDs, Blu-Ray™ disks, and the like.

The finite focal area of the read beam also imposes limits on tracking errors that may lower read efficiency. Effective reading of the data on an optical storage disk generally requires that a read head be positioned over data tracks on the disk. If the read head position should shift to one side or the other of the data track, substantial bit read errors may result. Various techniques may be used to maintain alignment, but generally this may be performed by using a reflective alignment track, along with an optical sensor, to maintain the alignment of the read head over a data track. However, this may add some complexity to the data storage unit. Further, as data storage capacity increases, such as in holographic storage systems, the required alignment may be difficult.

The present techniques provide methods and systems for alignment with data tracks on optical data disks. For example, a multi-pixel detector that is segmented into multiple areas, or detector segments, may be used to detect a pattern in the light reflected from an optical data disk. The pattern may include light scattered from a single bit that may be in a center data track under a center detector, and also light scattered from bits in adjacent tracks. The detector system may then combine the quantized values from each of the detector segments mathematically to determine the alignment of the read head with a target data track. If the read head drifts to one side or the other, detectors to the side of the center detector may start to pick up energy from the adjacent tracks. If this energy is continuously summed for the detectors on each side, the read head may be centered by balancing the sums from the detectors on each side. For example, if a left side bit sum is greater than a right side bit sum, the detector may be shifted to the right. In this manner, the center detector position may be maintained over a center track during the reading process.

The technique described above may be combined with a multi-segment center detector to increase the reading accuracy of the data in the center track, while maintaining the tracking alignment of the center detector. Further, a two dimensional segmented detector may be used to read multiple tracks in parallel, while maintaining the alignment accuracy over a center track.

Turning now to the figures, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 may be controlled by a processor 28 or may be controlled by dedicated servo electronics. The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
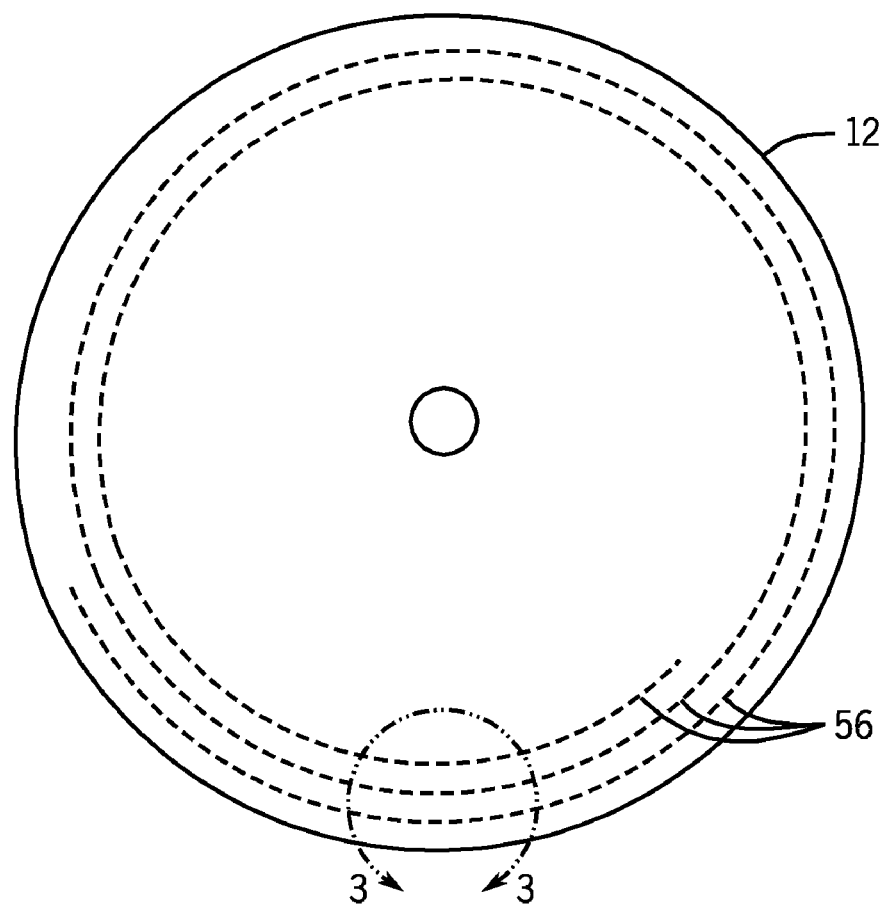
FIG. 2 illustrates an optical disk having data tracks, in accordance with an embodiment.

The reader 10 may be used to read an optical data disk 12 containing data as shown in FIG. 2. Generally, the optical data disk 12 is a flat, round disk with one or more data storage layers embedded in a transparent protective coating. The protective coating may be a transparent plastic, such as polycarbonate, polyacrylate, and the like. The data layers may include any number of surfaces that may reflect light, such as the micro-holograms used for bit-wise holographic data storage or a reflective surface with pits and lands. A spindle hole 56 couples to the spindle to control the rotation speed of the disk 12. The data may be generally written in a sequential spiraling track 57 from the outer edge of the disk 12 to an inner limit, although circular tracks, or other configurations, may be used.

Figure 3:
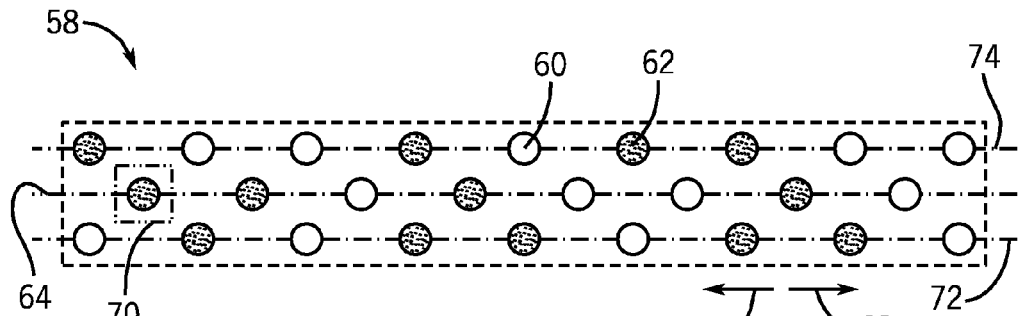
FIG. 3 is a close-up view of the tracks of an optical data disk, illustrating the reading of data in a center track.

A close-up view 58 of the top surface if the optical data disk 12 is shown in FIG. 3. In this view 58, each data position along the track may have a zero 60, indicating an absence of a micro-hologram, or a one 62, indicating a presence of a micro-hologram. A center track 64 contains a number of binary ones 62 and zeros 60. The disk spins in a first direction 66, which determines the read direction 68 for a detector 70. Essentially the detector 70 stays stationary over the spinning optical data disk 12, only moving laterally to be positioned over adjacent data tracks, such as data track 72 or data track 74. Accordingly, all references to direction in this disclosure are made with respect to the read direction 68, e.g., "forward" indicates an item in the read direction.

Figure 4:
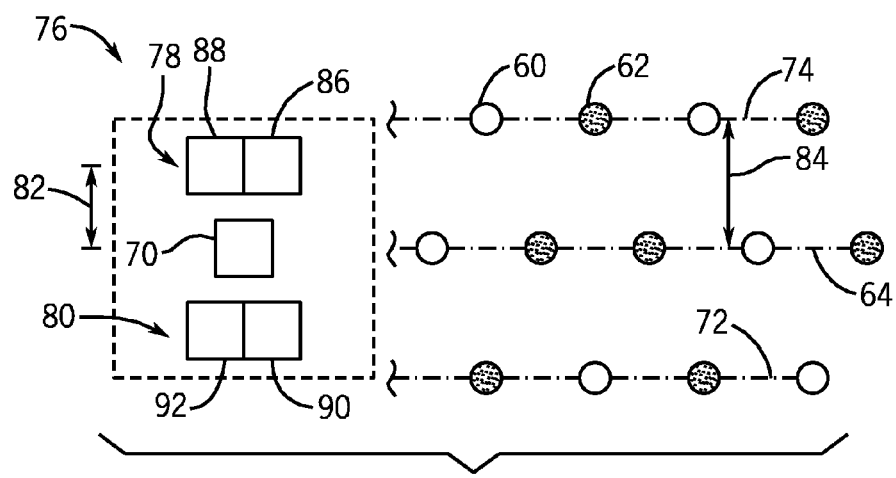
FIG. 4 is a schematic view of a read head that may be used to center a read head over a data track, in accordance with an embodiment.

In a contemplated embodiment of the present techniques, as illustrated in FIG. 4, a read head 76 may use multiple detectors to maintain alignment of the center detector 70 over a targeted data track 64. For example, the center detector 70 may be positioned between a left detector 78 and a right detector 80. The distance 82 between the center detector 70 and either of the other two detectors 78 and 80 may be less than the separation 84 between the target data track 64 and either of the adjacent tracks 72 and 74. The separation 84 between the adjacent data tracks 64 and 74 is generally about 1.5 times the width of the focal point of a read beam to decrease interferences from proximate bits. Accordingly, the left detector 78 may have a very low interaction with the left data track 74 so long as the center detector 70 does not drift off-center to the left. Similarly, the right hand detector 80 may have a very low interaction with the right hand data track 72 so long as the center detector 70 does not drift off-center to the right.

In one embodiment, the signals sensed at the left detector 78 and the right detector 80 may enable the estimation of the amount of light scattered and received at each microhologram candidate position on the tracks immediately adjacent to the track being read. Furthermore, the signals sensed at the detectors 78 and 80 may enable the detection of a bit change in the targeted data track 64, and may also enable the alignment of the center detector 70 between adjacent data tracks 72 and 74, keeping the center detector 70 substantially aligned over the targeted data track 64.

The detectors 78 and 80 may detect a change in the state of bits in the targeted data track 64. For example, in one embodiment, the left detector 78 may include a forward (with respect to the read direction) aperture 86 and a rearward aperture 88. Each of the apertures 86 and 88 may sense illumination as the read head 76 moves along the target data track 64. Since the left detector 78 includes two apertures that may each sense illumination, the left detector 78 may be termed a "dibit" detector. Accordingly, as used herein, the left detector 78 may also be referred to as the left dibit detector 78 and the right detector 80 may be referred to as the right dibit detector 80. Since the forward aperture 86 may sense a signal before the rearward aperture 88 senses the same signal, the read head 76 may be capable of comparing powers or energies between the forward aperture 86 and the rearward aperture 88 in the left detector 78. The left detector 78 may thus detect the change in powers or energies, or the difference between powers or energies received at the forward and rearward apertures 86 and 88.

The difference in the detected light intensity between the forward aperture 86 and the rearward aperture 88 may enable the determination of a change between a "0" or a "1" state. An example of this determination may be explained by the equation:

$$\Delta_L = I_f - I_r,$$

wherein $I_f$ represents the light intensity at the forward aperture 86, and $I_r$ represents the light intensity at the rearward aperture 88. The difference in light intensity, $\Delta_L$, may be used to drive a state machine that estimates the state of a bit or bits of data detected by the left detector 78. The transition rules for the state machine may be as shown in Table 1. In Table 1, $\Theta$ is a specified positive threshold, indicating that a bit has been detected, for example, 10%, 25%, 50%, or 75% of the maximum light intensity that may be detected.

TABLE 1

State Rules for Bit Determination Using Dibit Detector.

|  |  | next state | |
| --- | --- | --- | --- |
|  |  | 0 | 1 |
| present state | 1 | $\Delta < -\Theta$ | $\Delta \geq -\Theta$ |
|  | 0 | $\Delta < \Theta$ | $\Delta \geq \Theta$ |

Using Table 1 to illustrate an example, if the difference in light intensity $\Delta_L$ between the forward and rearward apertures 86 and 88 is equal to or above a certain threshold Θ, this may be taken to mean that the present state is 0 and the next state is 1. If the difference in light intensity $\Delta_L$ is less than the threshold −Θ, this may be taken to mean that the present state is 1 and the next state is 0. If neither of these threshold tests are met this may be taken to mean that the present state and the next state are the same bits. The right detector 80 may also have forward and rearward apertures 90 and 92, as the forward and rearward apertures 86 and 88 of the left detector 78. The right detector 80 may also detect a difference in light intensity between the forward aperture 90 and the rearward aperture 92, which may indicate changes in bit states, as previously described with respect to the left detector 78. Embodiments of the present technique may also enable the alignment of the center detector 70 between adjacent data tracks 72 and 74. A continuous sum, $S_L$, is formed by summing the light intensity on the forward aperture 86 when the forward aperture 86 is detecting a 1. The number of 1 states detected at the forward aperture 86 may be defined as $R_L$. Similarly, a continuous sum $S_R$ is formed by summing the light intensity on the forward aperture 90, and $R_R$ is the number of 1 states detected at the forward aperture 90. If the sum of light intensity for each 1 detected from the forward aperture 86 of the left detector 78 is greater than the sum of light intensity for each 1 detected from the forward aperture 90 of the right detector 80, then this may indicate that the read head 76 may be to the left of the targeted data track 64, and the optical reader system 10 (as in FIG. 1) may shift the read head 76 to the right. Alternatively, if the read head 76 is to the right of the targeted data track 64, the optical reader system 10 may shift the read head 76 to the left. An example of this relationship for repositioning the read head 76 may be depicted in the correction loop below:

If $S_L/R_L < S_R/R_R$, then shift read head left by δ, otherwise, shift read head right by δ.

The value for δ may be chosen as a fraction of the separation 84 between adjacent tracks 64 and 74, for example, ⅕, ⅒, ⅕₀, or ⅟₁₀₀ of the separation 84 between the adjacent tracks 64 and 74.

Figure 5:
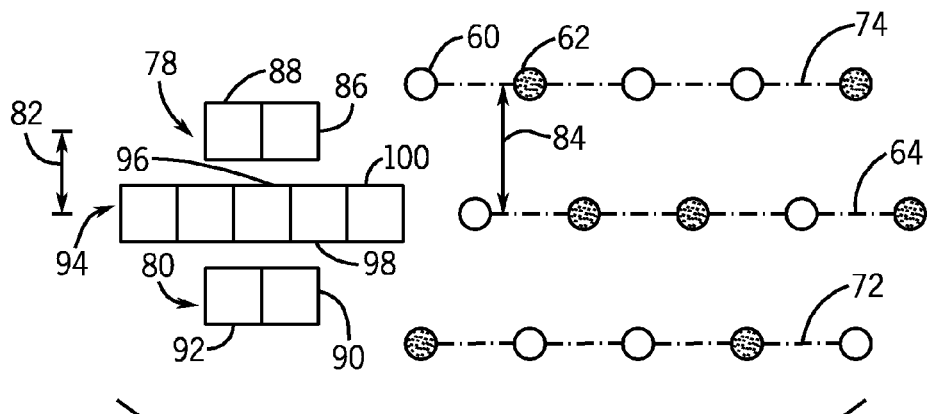
FIG. 5 is a schematic view of a read head that uses a segmented detector to improve the read accuracy of a data track, while keeping the read head centered over the data track in accordance with an embodiment.

The technique described above may be used with more complex detectors to improve both tracking and bit prediction accuracy. For example, FIG. 5 illustrates a read head that has a center multi-segmented detector 94. The left dibit detector 78 and the right dibit detector 80 function as described with respect to FIG. 4, above, to keep the center multi-segmented detector 94 aligned over the targeted data track 64. The multi-segmented detector 94 may improve the read accuracy by providing a pattern of the reflections from the targeted data track 64. The pattern may then be compared to a series of stored patterns, which correspond to all possible combinations of bits under the multi-segmented detector 94. The identification of a corresponding pattern may provide a more accurate prediction of the center bit 96. This system may also provide reasonably accurate predictions of the bits that lead the center bit 96, such as the first bit forward 98 of the center bit 96, and the second bit forward 100 of the center bit 96. These bit values may then be fed back to a bit predictor to enhance the accuracy of the prediction of the center bit 96.

Figure 6:
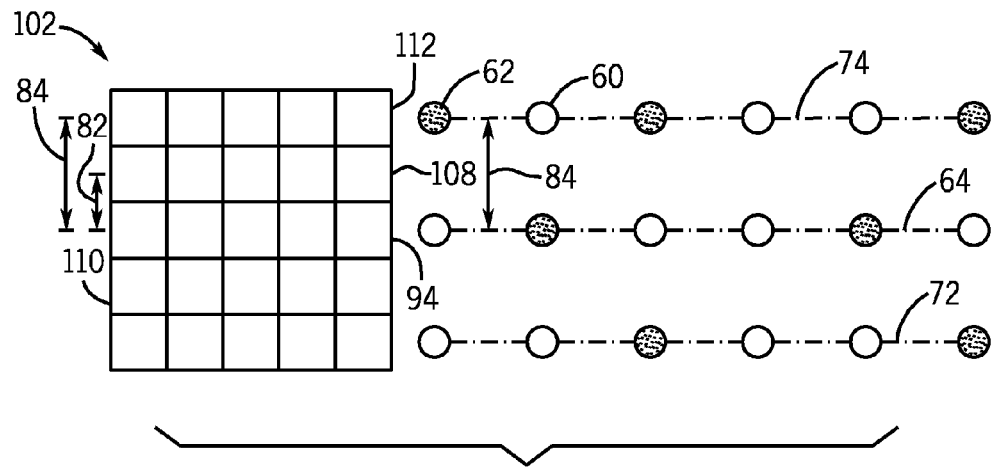
FIG. 6 is a schematic view of a two dimensional read head that may be used to read multiple tracks simultaneously, while keeping a read head centered over a data track in accordance with an embodiment.

Similar techniques may also be used with more complex detectors, as illustrated in FIG. 6. In FIG. 6, a two dimensional read head 102 may have a center multi-segmented detector 94 for reading a target track 64, wherein the center multi-segmented detector 94 is aligned with the target track 64. In addition to the center multi-segmented detector 94, the two dimensional read head 102 may have outer multi-segmented detectors, for example, detector 112, which are spaced apart from the center detector 94 by the separation 84 between adjacent tracks 64 and 74. The outer detectors may be aligned with tracks adjacent to the center track 64, e.g., data tracks 72 and 74, and may allow data bits 60 and 62 along these tracks to be read in parallel with the center data track 64 to increase the reading speed.

Adjacent to the center multi-segmented detector 94, the two dimensional read head 102 may have alignment detectors 108 and 110, wherein the distance 82 between the center multi-segmented detector 94 and the alignment detectors 108 and 110 is less than the distance between adjacent data tracks 64, 74, and 72. Accordingly, the alignment detectors 108 and 110 may be used in techniques similar to those described for FIG. 4 to keep the read head 102 aligned with the data tracks 64, 72, and 74.

The detectors discussed above, or any detectors in accordance with the present technique, may improve the read accuracy by providing a pattern of the reflections from the targeted data track 64. The pattern may then be compared to a series of templates, or stored patterns, which correspond to all possible combinations of bits provided by the detector. As discussed, the identification of a corresponding pattern may provide a more accurate prediction of the center bit and/or surrounding bits. Furthermore, the method of comparing the pattern with templates may enable the detector to maintain a particular data track or to maintain a desired focus. More specifically, the pattern provided by the detector may be compared to templates representing that a pattern provided by a detector that is off the center track. For example, the holographic system may comprise a database of "off-track" templates, such that if a pattern matches with one of the off-track templates, the system may identify that the read head or detector position is not aligned. Matching a pattern with an off-track template may also indicate to the system how to realign the read head to the center track (e.g., matching a pattern with a certain off-track template may indicate that the read head should be shifted a certain distance to the right, or to the left).

The method of comparing the pattern provided by a detector with templates may also enable the detector to maintain a desired focus. The pattern may be compared to templates representing that a pattern is out of focus. For example, the holographic system may comprise a database of "out-of-focus" templates, such that if a pattern matches with one of the out-of-focus templates, the system may identify that the detector is not in focus. Different degrees of focus may also be provided in the template database, which may enable the system to determine how out of focus the detector is, and how to readjust the focus. For example, if a pattern is out of focus, the detector may be shifted up or down so that the center point of the beam is properly focused on a data bit or bits of data, and matching a pattern with a certain out-of-focus template may indicate that the detector should be shifted a certain distance up or down to regain focus. Furthermore, a combination of off-track templates or out-of-focus templates, or other templates may be compared with the pattern provided by the detector to maintain alignment and focus, or for various other applications.

While the comparison of patterns with templates may be conducted without previous knowledge of the position or state of bits reflected in the patterns, the template comparison technique may also include recording patterns provided by the detector into the template database. For example the holographic system may receive a pattern from the reflection of bits at a particular position in the optical data disk, and the system may store this pattern as a template for that position. A stored pattern over a particular position may be used in the future as a template the next time the detector is reading that particular position. Such a template may be used to maintain alignment and/or focus, or for various other applications.

Figure 7:
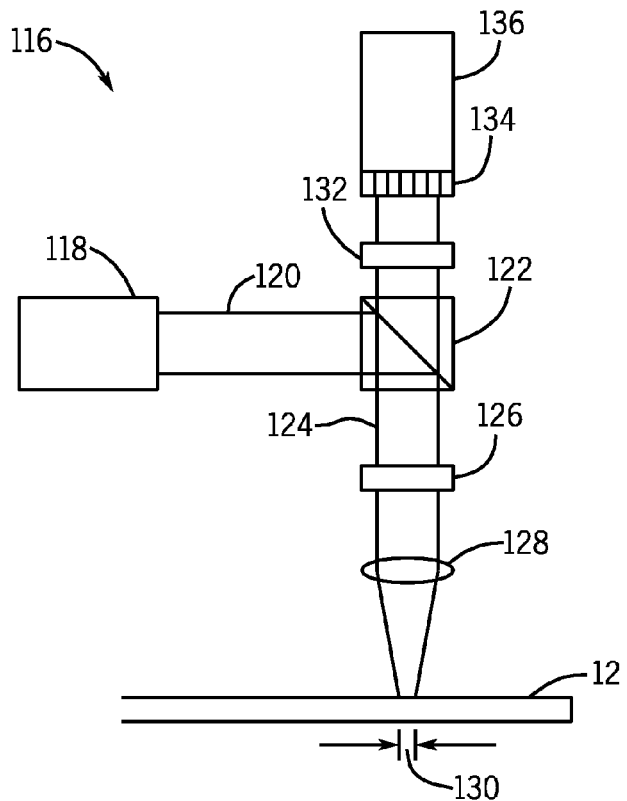
FIG. 7 is a schematic view of a detector that may be used to center a read head over a data track in accordance with an embodiment.

An example of a multi-pixel detector 116 that may be used to read data from an optical data disk 12 is illustrated in the schematic diagram shown in FIG. 7. In the detector 116, a light source 118 emits a collimated beam 120. The light source 118 may be a laser diode, and may include optical elements for collimating the beam 120. Alternatively, exterior optical elements, such as one or mores lenses, may be used for the collimation. The collimated beam 120 is impinged on a polarizing beam splitter 122 which directs the beam toward the optical data disk 12 (FIG. 1) as a read beam 124. The read beam passes through a quarter wave plate 126, which rotates the polarity of the read beam 124. The read beam 124 is then focused on the disk by a lens 128. The diameter 130 of the focal area of the read beam 124 may cover a single bit position on the optical storage disk 12, or the diameter 130 may cover several adjacent bit positions, including adjacent tracks. The larger diameter 130 for the focal area may be useful if parallel reading of multiple bits is desired, such as by the two dimensional detector system discussed with respect to FIG. 6. A smaller diameter 130 for the focal area may be useful if the only purpose of the multi-pixel detector is to improve the tracking of the read head, such as by the read head 76 described with respect to FIG. 4.

Reflected light from the optical storage disk 12 is collected and collimated by the lens 128, and passes through the quarter wave plate 126. After this second pass through the quarter wave plate 126, the polarization of the light is rotated by 90°, and passes through the polarizing beam splitter 122 with substantially no light reflected toward the emitter 118. The reflected light may be passed through any number of processing units 132 prior to impinging on the segmented detector 134. Such processing units 132 may include an electro-optical modulator, which may adjust the phase of the reflected light, and thus lower the intensity of the light reflected from micro-holograms in non-targeted layers that have imposed phase delays. Other processing units 132 may be used instead of, or in addition to, an electro-optical modulator. For example, the reflected light may be focused by a lens through a pinhole filter, which may be used to decrease the amount of light returned from off-axis reflections. After passing through the pinhole filter, the light may be impinged on a second lens, which may collimate the light prior to the light impinging on the segmented detector 134.

The segmented detector 134 may have alignment detectors adjacent to a center detector as discussed with respect to FIGS. 4 and 5. Alternatively, the segmented detector 134 may be a two dimensional array as discussed with respect to FIG. 6. Further, the segmented detector 134 may be coupled to an analysis processor 136, which may perform the alignment calculations and provide a control signal to the tracking servo 24 discussed with respect to FIG. 1.

Figure 8:
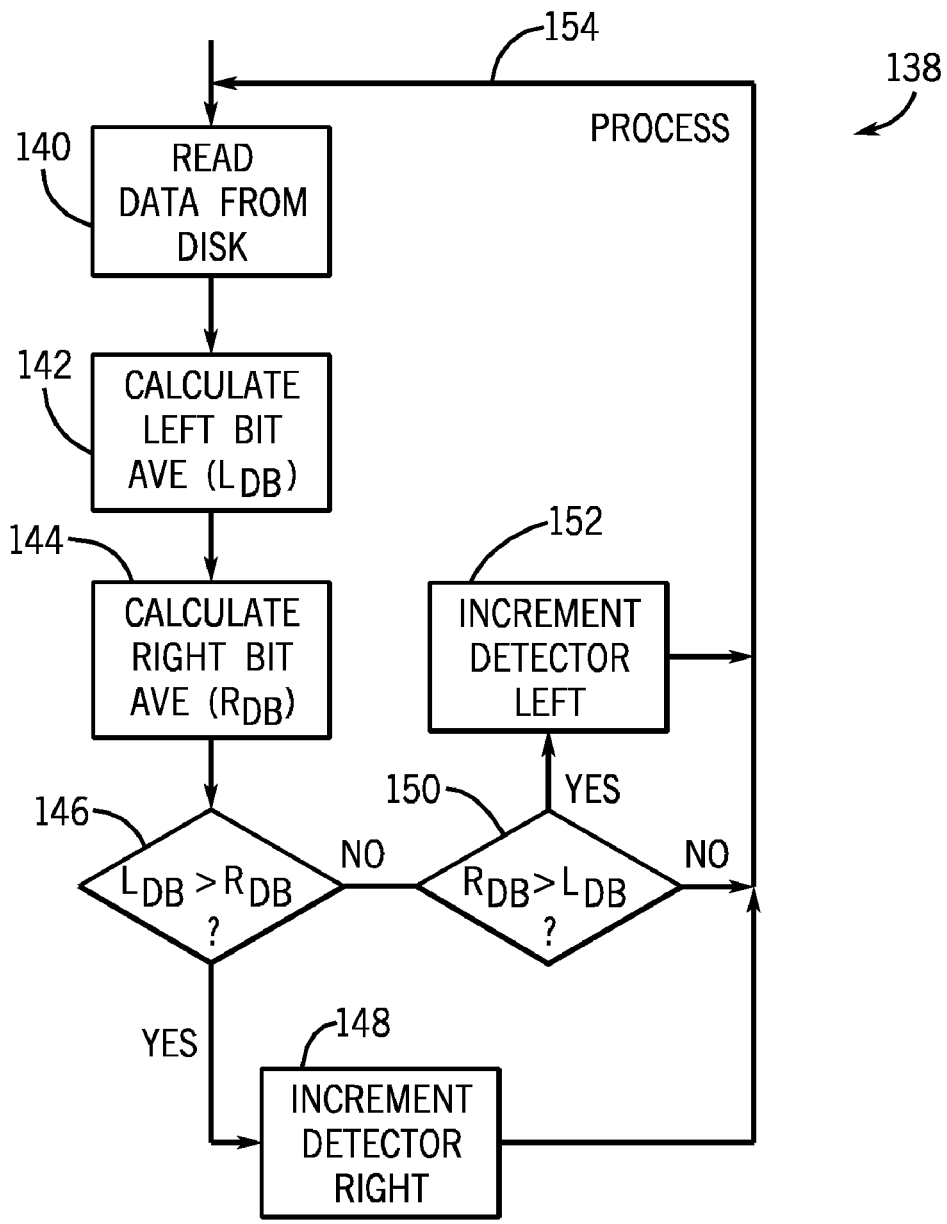
FIG. 8 is a flow chart of a method for centering a read head over a data track.

A general method 138 that may be used to control the tracking of a read head over an optical data disk is illustrated in the flow chart in FIG. 8. The method 138 begins in block 140 by reading data from the data disk using a read head having multiple detectors, for example, as discussed with respect to FIGS. 4-6. Referring also to the discussion of FIG. 4, the method 138 does not start until at least 'R' data bits have been read from the disk to ensure that a meaningful average intensity for the left and right sums is calculated. The method proceeds to calculate a left bit average intensity, i.e. $L_{DB}=S_L/R_L$, in block 142. In block 144, a right bit average intensity, $R_{DB}=S_R/R_R$ is calculated from the right detector.

In block 146, the average intensity for the left detector, $L_{DB}$, may be compared to the average intensity for the right detector, $R_{DB}$. If the average intensity for the left detector is greater than that of the right detector, the read head is shifted to the right, as indicated in block 148. If the average intensity for the right detector is greater than the left detector, as indicated in block 150, then the detector is shifted to the left, as indicated in block 152. The method 138 then returns to block 140, as indicated by line 154, to continue reading the disk.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of reading data in an optical disk drive, comprising:
   emitting a read beam toward the optical data disk;
   detecting light reflected from the optical data disk by a multi-pixel detector; and
   analyzing a pattern detected by the multi-pixel detector to adjust a read process of the multi-pixel detector, wherein analyzing the pattern comprises:
   reading data from a center data track;
   calculating a left average of bit intensity detected in a left detector of the multi-pixel detector, wherein the left detector detects intensity in an adjacent track to a left side of the center data track;
   calculating a right average of bit intensity detected in a right detector of the multi-pixel detector, wherein the right detector detects intensity in an adjacent track to a right side of the center data track; and
   adjusting a position of the multi-pixel detector to substantially balance the average of bit intensity detected in the left detector and the average of bit intensity detected in the right detector.

2. The method of claim 1, comprising:
   measuring a difference between a left forward aperture and a left rearward aperture to detect a value for a bit state in the track to the left side of the center data track; and
   measuring a difference between a right forward aperture and a right rearward aperture to detect a value for a bit state in the track to the right side of the center data track.

3. The method of claim 1, comprising:
   comparing the left average of bit intensity detected in the left detector to the right average of bit intensity detected in the right detector, and
   if the left average is greater than the right average, shifting the multi-pixel detector to a right of a current position; and
   if the right average is greater than the left average, shifting the multi-pixel detector to a left of the current position.

4. The method of claim 1, comprising:
   demodulating a sequence of symbols read from the center data track to generate a bit stream;
   decoding the bit stream to remove redundant bits and correct read errors and form a digital signal; and
   providing the digital signal to an output device.

5. A method of reading data in an optical disk drive, comprising:
   emitting a read beam toward the optical data disk;
   detecting light reflected from the optical data disk by a multi-pixel detector; and
   analyzing a pattern detected by the multi-pixel detector to adjust a read process of the multi-pixel detector, wherein analyzing the pattern comprises:

comparing the pattern detected by the multi-pixel detector to a series of stored patterns;
identifying a stored pattern corresponding to the pattern; and
predicting a state of a bit based at least in part upon the stored pattern.

6. A method of reading data in an optical disk drive, comprising:
emitting a read beam toward the optical data disk;
detecting light reflected from the optical data disk by a multi-pixel detector; and
analyzing a pattern detected by the multi-pixel detector to adjust a read process of the multi-pixel detector, wherein analyzing the pattern comprises:
comparing the pattern detected by the multi-pixel detector to a series of stored patterns;
identifying a stored pattern corresponding to the pattern; and
substantially aligning the multi-pixel detector along a path of the multi-pixel detector based on the identification of the stored pattern.

7. The method of claim 6, wherein the stored pattern is not aligned, and wherein identifying the stored pattern corresponding to the pattern indicates that the pattern is not aligned.

8. A method of reading data in an optical disk drive, comprising:
emitting a read beam toward the optical data disk;
detecting light reflected from the optical data disk by a multi-pixel detector; and
analyzing a pattern detected by the multi-pixel detector to adjust a read process of the multi-pixel detector, wherein analyzing the pattern comprises:
comparing the pattern detected by the multi-pixel detector to a series of stored patterns;
identifying a stored pattern corresponding to the pattern; and
adjusting the focus of the read beam of the multi-pixel detector based on the identification of the stored pattern.

9. The method of claim 8, wherein the stored pattern is not focused, and wherein identifying the stored pattern corresponding to the pattern indicates that the pattern is not focused.

10. A detector for reading optical disks, comprising:
an emitter configured to emit a collimated beam;
optical elements configured to focus the collimated beam onto an area of a data disk and collect light reflected from the area of the data disk;
a multi-pixel detector configured to detect a pattern from the light reflected from the data disk, wherein the multi-pixel detector comprises:
a center detector configured to read a center data track;
a left side detector, disposed on a left side of the center detector at a distance that is less than the separation between two adjacent data tracks; and
a right side detector, disposed on a right side of the center detector at a distance that is less than the separation between two adjacent data tracks; and
a comparator configured to analyze the pattern and adjust a tracking of the multi-pixel detector.

11. The detector of claim 10, wherein each of the left side detector and the right side detector comprise a forward aperture disposed adjacent to a rearward aperture, wherein the forward and rearward apertures are oriented in a parallel fashion to the center data track.

12. The detector of claim 11, wherein:
the right side detector is configured to detect the state of a bit in an adjacent track on the right side of the center data track, if the center detector deviates to the right side of the center data track; and
the left side detector is configured to detect the state of a bit in an adjacent track on the left side of the center data track, if the center detector deviates to the left side of the center data track.

13. The detector of claim 12, wherein the comparator is configured to:
calculate a right average, wherein the right average is an average intensity of present bits detected by the right side detector;
calculate a left average, wherein the left average is an average intensity of present bits detected by the left side detector; and
adjust a position of the multi-pixel detector to substantially equalize the right average and the left average.

14. The detector of claim 10, wherein the center detector comprises a one dimensional array of pixels substantially aligned with the center data track.

15. The detector of claim 10, comprising a two dimensional array of pixels, wherein a center row of pixels is configured to be substantially aligned with the center data track, and wherein the right side detector comprises a row of pixels on the right side of the center data track, and the left side detector comprises a row of pixels on the left side of the center data track.

16. A system for reading a data disk, comprising:
a multi-pixel detector configured to read a sequence of patterns from an optical disk;
a bit predictor configured to analyze each of the patterns in the sequence and predict a value for a bit from the pattern to form a sequence of bits;
a comparator configured to analyze each of the patterns in the sequence and adjust a tracking of the multi-pixel detector; and
a processor configured to analyze the sequence of bits and generate a digital data signal.

17. The system of claim 16, comprising an output device configured to provide the digital data signal to other devices.

18. The system of claim 16, comprising an analog-to-digital converter.

19. The system of claim 16, wherein the bit predictor comprises an analog computer, a hybrid computer, or a neural network, or any combination thereof.

* * * * *